(12) United States Patent
Ferrari et al.

(10) Patent No.: US 12,552,665 B2
(45) Date of Patent: Feb. 17, 2026

(54) METHOD FOR MANUFACTURING AN INTEGRATED SYSTEM INCLUDING A CAPACITIVE PRESSURE SENSOR AND AN INERTIAL SENSOR, AND INTEGRATED SYSTEM

(71) Applicant: STMICROELECTRONICS S.r.l., Agrate Brianza (IT)

(72) Inventors: Paolo Ferrari, Gallarate (IT); Lorenzo Corso, Ruginello (IT); Flavio Francesco Villa, Milan (IT); Silvia Nicoli, Casatenovo (IT); Luca Lamagna, Cassina de' Pecchi (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 621 days.

(21) Appl. No.: 17/896,692

(22) Filed: Aug. 26, 2022

(65) Prior Publication Data
US 2023/0061430 A1 Mar. 2, 2023

(30) Foreign Application Priority Data
Aug. 30, 2021 (IT) .................... 102021000022511

(51) Int. Cl.
*B81B 7/02* (2006.01)
*B81C 1/00* (2006.01)

(52) U.S. Cl.
CPC ............ *B81C 1/00341* (2013.01); *B81B 7/02* (2013.01); *B81B 2201/0235* (2013.01);
(Continued)

(58) Field of Classification Search
CPC .............. B81B 7/02; B81B 2201/0235; B81B 2201/0242; B81B 2201/0264;
(Continued)

(56) References Cited

U.S. PATENT DOCUMENTS

| 9,550,668 B1 | 1/2017 | Xia et al. |
| 2005/0250235 A1 | 11/2005 | Miles et al. |

(Continued)

FOREIGN PATENT DOCUMENTS

| CN | 101544349 A | 9/2009 |
| CN | 101762971 A | 6/2010 |

(Continued)

OTHER PUBLICATIONS

Bakke et al., "Etch Stop Materials for Release by Vapor HF Etching," Proc. MicroMechanics Eur. Workshop, vol. 16, pp. 103-106, 2005.

(Continued)

*Primary Examiner* — Moazzam Hossain
(74) *Attorney, Agent, or Firm* — Seed IP Law Group LLP

(57) ABSTRACT

Method for manufacturing a micro-electro-mechanical system, MEMS, integrating a first MEMS device and a second MEMS device. The first MEMS device is a capacitive pressure sensor and the second MEMS device is an inertial sensor. The steps of manufacturing the first and second MEMS devices are, at least partly, shared with each other, resulting in a high degree of integration on a single die, and allowing to implement a manufacturing process with high yield and controlled costs.

20 Claims, 10 Drawing Sheets

(52) U.S. Cl.
CPC ............... *B81B 2201/0242* (2013.01); *B81B 2201/0264* (2013.01); *B81B 2203/0127* (2013.01); *B81B 2203/0315* (2013.01); *B81C 2201/0109* (2013.01); *B81C 2201/0133* (2013.01); *B81C 2201/014* (2013.01); *B81C 2201/0176* (2013.01); *B81C 2203/032* (2013.01); *B81C 2203/035* (2013.01)

(58) Field of Classification Search
CPC ...... B81B 2201/0228; B81B 2201/025; B81C 1/00158; B81C 2201/0115; B81C 2201/0177; G01L 9/0042
See application file for complete search history.

(56) References Cited

U.S. PATENT DOCUMENTS

| | | | |
|---|---|---|---|
| 2006/0056474 | A1 | 3/2006 | Fujimoto et al. |
| 2006/0084275 | A1 | 4/2006 | You et al. |
| 2006/0180082 | A1 | 8/2006 | Iwamoto et al. |
| 2006/0278879 | A1 | 12/2006 | Busta |
| 2008/0001249 | A1 | 1/2008 | Sheen et al. |
| 2009/0064785 | A1* | 3/2009 | Fukuda ............... B81C 1/00246 73/514.32 |
| 2009/0305478 | A1 | 12/2009 | Yang |
| 2010/0006957 | A1 | 1/2010 | Verheijden et al. |
| 2010/0062224 | A1 | 3/2010 | Witvrouw et al. |
| 2010/0320548 | A1 | 12/2010 | Tsau et al. |
| 2011/0104882 | A1 | 5/2011 | Ono et al. |
| 2011/0207283 | A1 | 8/2011 | Haukka et al. |
| 2012/0091522 | A1 | 4/2012 | Ozaki et al. |
| 2012/0313235 | A1 | 12/2012 | Chu et al. |
| 2014/0231937 | A1 | 8/2014 | Losa et al. |
| 2015/0246807 | A1* | 9/2015 | Chu .................... G01L 9/0044 257/419 |
| 2016/0320258 | A1 | 11/2016 | Zhang |

FOREIGN PATENT DOCUMENTS

| | | |
|---|---|---|
| CN | 103708409 A | 4/2014 |
| CN | 103712720 A | 4/2014 |
| CN | 104743498 A | 7/2015 |
| CN | 104891418 A | 9/2015 |
| CN | 105874312 A | 8/2016 |
| CN | 111704104 A | 9/2020 |
| DE | 102010000864 A1 | 7/2011 |
| DE | 102016216207 A1 | 3/2018 |
| EP | 1083144 A1 | 3/2001 |
| EP | 2259019 A1 | 12/2010 |
| EP | 3159301 A1 | 4/2017 |
| WO | WO 2008053008 A2 | 5/2008 |

OTHER PUBLICATIONS

Dawson, N. M., "Atomic Layer Deposition of Aluminum Oxide," thesis, University of California—Santa Cruz, May 30, 2010, 28 pgs.

DelRio, F. et al., "Atomic Layer Deposition of Al2O3/ZnO Nano-scale Films for Gold RF MEMS," 2004 IEEE MTT-S International Microwave Symposium Digest, Fort Worth, TX, p. 1923-1926.

George, Steven M., "Atomic Layer Deposition: An Overview," Chem. Rev. 110:111-131, 2010.

Groner et al., "Gas diffusion barriers on polymers using Al2O3 atomic layer deposition," Applied Physics Letters 88(051907):88-90, 2006.

Groner et al., "Low-Temperature Al2O3 Atomic Layer Deposition," Chem. Mater. 16:639-645, 2004.

Herrmann et al., "Conformal hydrophobic coatings prepared using atomic layer deposition seed layers and non-chlorinated hydrophobic precursors," J. Micromech. Microeng. 15:984-992, 2005.

Hoivik et al., "Atomic layer deposited protective coatings for micro-electromechanical systems," Sensors and Actuators A(103):100-108, 2003.

Mayer et al., "Atomic-layer deposition of wear-resistant coatings for microelectromechanical devices," Applied Physics Letters 82(17):2883-2885, Apr. 28, 2003.

Puurunen, R., " Surface chemistry of atomic layer deposition: a case study for trimethylaluminum/water process," Journal of Applied Physics 97(12), 55 pgs., 2005.

Tang et al., "Novel Polymeric Protective Coatings for Hydrofluoric Acid Vapor Etching During Mems Release Etch," IMAPS Device Packaging Converence, pp. 76-80, 2010.

Tripp et al., "The mechanical properties of atomic layer deposited alumina for use in micro- and nano-electromechanical systems," *Sensors and Actuators A* 130-131:419-429, 2006.

Wallin et al., "Influence of residual water on magnetron sputter deposited crystalline Al2O3 thin films," *Thin Solid Films* 516:3877-3883, 2008.

\* cited by examiner

METHOD FOR MANUFACTURING AN INTEGRATED SYSTEM INCLUDING A CAPACITIVE PRESSURE SENSOR AND AN INERTIAL SENSOR, AND INTEGRATED SYSTEM

BACKGROUND

Technical Field

The present disclosure relates to a method for manufacturing a micro-electro-mechanical system (MEMS), and to a micro-electro-mechanical system including a first MEMS device and a second MEMS device. In particular, the first MEMS device is a capacitive pressure sensor and the second MEMS device is an inertial sensor, or a combination of inertial sensors, such as for example an accelerometer and a gyroscope.

Description of the Related Art

The capacitive pressure sensor is provided with a suspended region, or membrane, capable of moving with respect to the rest of the structure. In particular, this membrane represents a variable electrode, facing a fixed portion forming a fixed electrode and separated therefrom through a partially or totally buried cavity. The inertial sensor is manufactured at the same time as the pressure sensor using, at least partly, the same process flow.

As is known, a MEMS (Micro-Electro-Mechanical System)-type transducer comprises a movable sensitive structure for transducing an environmental quantity (pressure, movement, acoustic wave, etc.) into an electrical quantity (for example a capacitive variation). Suitable reading electronics is for carrying out processing operations (including amplification and filtering operations) of this electrical quantity so as to provide an electrical output signal (for example an electrical voltage) representative of the sensed pressure value.

In case a capacitive sensing principle is used, the micro-electro-mechanical sensitive structure generally comprises a movable electrode, made as a diaphragm or membrane, arranged facing a fixed electrode, to provide the plates of a sensing capacitor with variable capacitance. The movable electrode is anchored through a first portion thereof, which is generally perimetral, to a structural layer, while a second portion thereof, which is generally central, is free to move or bend. The movable electrode and the fixed electrode thus form a capacitor, and the bending of the membrane that forms the movable electrode causes a variation of capacitance, as a function of the quantity to be sensed.

Other types of transducers, for example for sensing a movement or a vibration, are also known as accelerometers and gyroscopes, and operate similarly to what has been described above. The sensing structure is not, in this case, a membrane, but is formed by one or more movable masses coupled through springs to a fixed support structure. Also in this case, the transduction of the movement signal may occur capacitively, in a per se known manner.

Sensors of the aforementioned type, together with other MEMS sensors, are commonly mounted in multimedia electronic devices, such as, e.g., smartphones, smartwatches, consumer electronics products or other professional instrumentation, etc. The integration of a considerable number of MEMS systems/sensors in an electronic device requires the use of dedicated integrated circuit boards and therefore has a considerable impact on space occupation.

Furthermore, according to the prior art, different sensors are typically accommodated in a respective package which contains the transducer and the electronics for the acquisition and pre-processing of the electrical signals generated by the transducer, typically an ASIC circuit. In some solutions, the ASIC may be shared, such as, e.g., discussed in WO 2013/061313.

However, there is an increasing demand by the market for solutions with a high degree of integration, which allow cost savings and above all a reduction in area occupation.

BRIEF SUMMARY

The object of the present disclosure is to provide a solution to the previously illustrated needs.

According to the present disclosure, a method for manufacturing a MEMS system and a MEMS system thus obtained are provided.

For example, in at least one embodiment of the present disclosure, a method for manufacturing a micro-electro-mechanical system (MEMS) including a first MEMS device and a second MEMS device, comprising the steps of: forming, on a substrate, a first electrode of the first MEMS device; forming, on the first electrode, a first sacrificial layer of a material that may be removed through an etching chemical solution; forming, on the first sacrificial layer, a protection layer impermeable to said etching chemical solution; selectively removing portions of the protection layer to expose a respective sacrificial portion of the first sacrificial layer; forming, on the sacrificial portion, a membrane layer of a porous material, which is permeable to said etching chemical solution; forming a cavity by removing the sacrificial portion through the membrane layer using said etching chemical solution; forming a first structural layer which seals pores of the membrane layer and forms, with the membrane layer, a suspended structure of the first MEMS device, said suspended structure being a second electrode capacitively coupled to the first electrode through the cavity; forming, above the first structural layer, a second sacrificial layer of a material which may be etched through said etching chemical solution; forming a second structural layer above, and in contact with, the second sacrificial layer; patterning the second structural layer to concurrently form movable structures of the second MEMS device and biasing structures of the first and second electrodes of the first MEMS device; removing selective portions of the second sacrificial layer through said etching chemical solution, making said movable structures of the second MEMS device and said suspended structure of the first MEMS device free to move according to respective degrees of freedom.

For example, in at least one embodiment of the present disclosure a micro-electro-mechanical system (MEMS) including a first MEMS device and a second MEMS device, and comprising: a substrate; a first electrode pertaining to the first MEMS device extending on the substrate; a first sacrificial layer, of a material that may be removed through an etching chemical solution, on the first electrode; a protection layer, impermeable to said etching chemical solution, on the first sacrificial layer; a membrane layer, of a porous material which is permeable to said etching chemical solution, on the sacrificial portion; a cavity extending under the membrane layer; a first structural layer which seals pores of the membrane layer and forms, with the membrane layer, a suspended structure of the first MEMS device, said suspended structure being a second electrode capacitively coupled to the first electrode through the cavity; and a second structural layer patterned to form movable structures of the second MEMS device and biasing structures of the first and second electrodes of the first MEMS device, wherein said movable structures of the second MEMS device and said suspended structure of the first MEMS device are free to move according to respective degrees of freedom.

BRIEF DESCRIPTION OF THE SEVERAL VIEWS OF THE DRAWINGS

For a better understanding of the present disclosure, preferred embodiments thereof are now described, purely by way of non-limiting example, with reference to the attached drawings, wherein.

DETAILED DESCRIPTION

Figure 1:
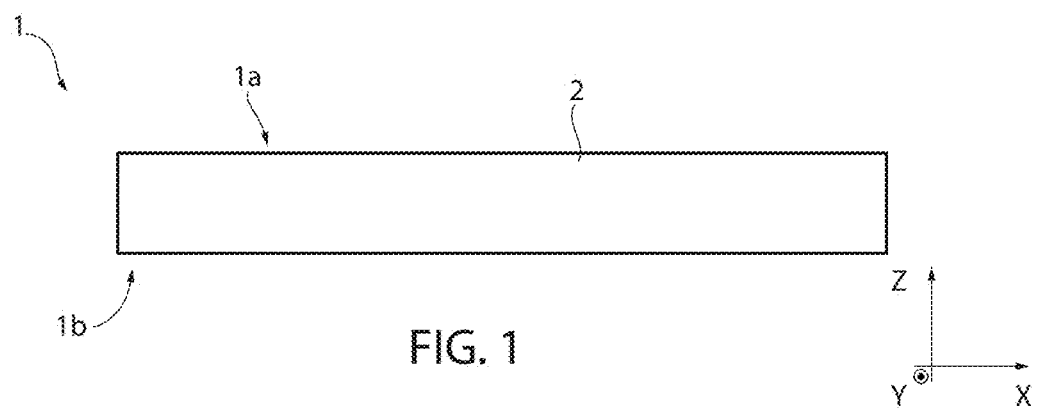
FIGS. 1-19 illustrate, in lateral cross-section view, manufacturing steps of an integrated micro-electro-mechanical system (MEMS), in particular including a capacitive pressure sensor and an inertial sensor, according to an embodiment of the present disclosure.

FIGS. 1-19 show subsequent manufacturing steps of a micro-electro-mechanical (MEMS) device or system 50 according to an embodiment of the present disclosure. In particular, the MEMS system 50 integrates one or more first micro-electro-mechanical structures 51 for transducing an environmental pressure signal into a respective electrical signal, and one or more second micro-electro-mechanical structures 52 for transducing a movement signal (vibration, motion, etc.) into a respective electrical signal.

Hereinafter, the first micro-electro-mechanical structure 51 is also referred to as a pressure sensor; in particular, the transduction is performed on the basis of a variation of a capacitance (capacitive pressure sensor).

Hereinafter, the second micro-electro-mechanical structure 52 is also referred to as an inertial sensor. The second micro-electro-mechanical structure 52 may be one of an accelerometer and a gyroscope, or a combined structure that includes both an accelerometer and a gyroscope.

FIGS. 1-19 illustrate a die in a lateral cross-section view, in a triaxial reference system of axes X, Y, Z orthogonal to each other. Die 1 is, typically and up to the dicing or singulation step, part of a wafer not shown in its entirety.

FIG. 1 shows the die 1, having a front side 1a and a rear side 1b opposite to each other along the axis Z, comprising a substrate 2 of semiconductor material, typically silicon.

Figure 2:
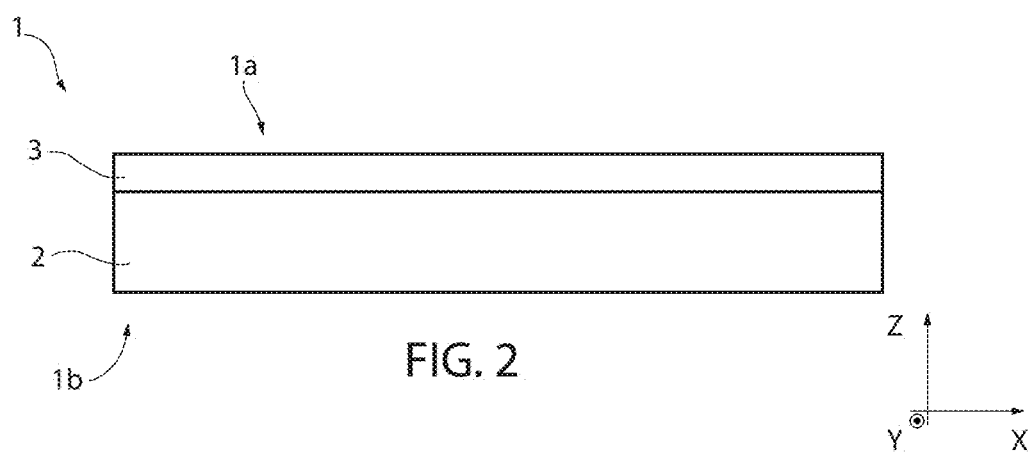

With reference to FIG. 2, at the front side 1a, an insulating layer 3, for example silicon oxide ($SiO_2$) is formed, having a thickness comprised between 0.2 and 2 µm, typically 0.5 µm. The insulating layer 3 is for example formed by thermal oxidation.

Figure 3:
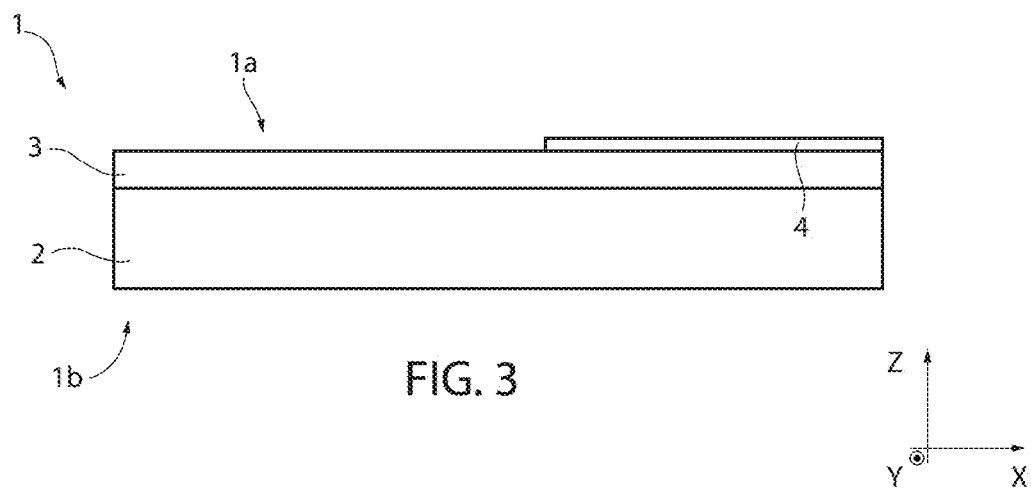

In FIG. 3, a structural layer 4, of electrically conductive material, for example of N-type doped polysilicon (e.g., with doping density comprised between $1 \cdot 10^{19}$ and $2 \cdot 10^{20}$ ions/$cm^3$), is formed on the insulating layer 3. In one embodiment, the structural layer 4 is formed through deposition of polysilicon with the LPCVD technique; the structural layer 4 has, for example, a thickness comprised between 0.2 and 0.6 µm.

With reference to the pressure sensor of capacitive type, the structural layer 4 forms a bottom electrode of the pressure sensor (i.e., the bottom plate of the capacitor). The structural layer 4 is patterned (e.g., photolithographically) to define the desired and/or expected shape during the design step of the bottom electrode of the pressure sensor.

Figure 4:
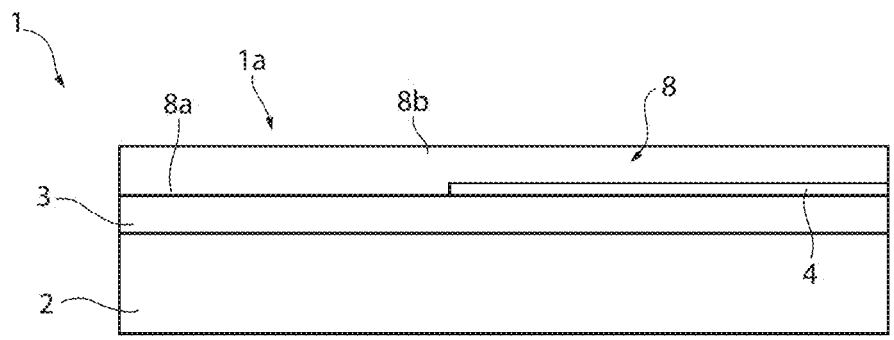

Then, FIG. 4, a sacrificial layer 8, e.g., of silicon oxide, is formed. The thickness of this sacrificial layer 8, at and above the structural layer 4, is comprised between 0.4 and 2 µm. To compensate for the presence of the "step" between the insulating layer 3 and the structural layer 4, and to form a sacrificial layer 8 having a planar top surface, a planarization step is performed (e.g., via CMP) after forming the sacrificial layer 8.

Alternatively, the sacrificial layer 8 may be formed in two sub-steps subsequent to each other, comprising:
  forming a first sacrificial sub-layer 8a, here of silicon oxide deposited with the PECVD technique (TEOS or oxide based on silane), up to complete coverage of the structural layer 4 (the thickness of the first sacrificial sub-layer 8a, measured along the axis Z laterally to the structural layer 4, is greater than the thickness of the structural layer 4);
  planarizing the first sacrificial sub-layer 8a, for example with the CMP technique, to obtain a flat top surface; and
  forming a second sacrificial sub-layer 8b, here of silicon oxide deposited with the PECVD technique (TEOS or oxide based on silane), above the first sacrificial sub-layer 8a; the thickness of the second sacrificial sub-layer 8b, measured along the axis Z from the top surface of the first sacrificial sub-layer 8a, is comprised between 300 nm and 2 µm; and
  performing, optionally, a further planarization step of the second sacrificial sub-layer 8b.

The first and second sacrificial sub-layers 8a, 8b form, together, the sacrificial layer 8. The thickness of this sacrificial layer 8, at the structural layer 4, is for example comprised between 500 nm and 2.3 µm.

Figure 5:
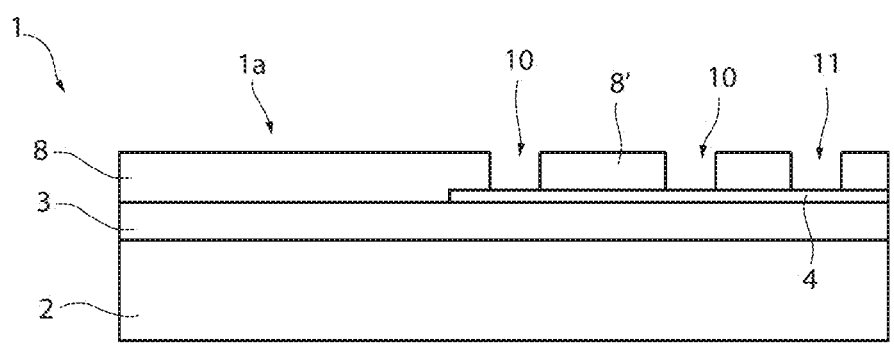

Then, FIG. 5, an etching of the sacrificial layer 8 is performed so as to form a trench 10 which surrounds, or internally delimits, a region 8' of the sacrificial layer 8. The trench 10 extends along the axis Z throughout the thickness of the sacrificial layer 8 above the structural layer 4 and exposes respective regions of the structural layer 4. In this manner, the region 8' is separated from the remaining portions of the sacrificial layer 8 by the trench 10. The shape of the region 8', defined by the trench 10, corresponds to the desired shape of the cavity having the two conductive plates of the capacitor which forms the sensitive element of the pressure sensor facing therethrough, as better evident from the following description.

In this same manufacturing step, one or more further portions of the sacrificial layer 8 are also removed which extend above the structural layer 4, but which are external to the region 8' delimited by the trench 10; an opening 11 is thus formed which reaches the structural layer 4 and forms an access to the structural layer 4 through which, as better illustrated below, an electrical contact will be formed to bias the structural layer 4 (which is the bottom electrode of the capacitor of the pressure sensor).

Figure 6:
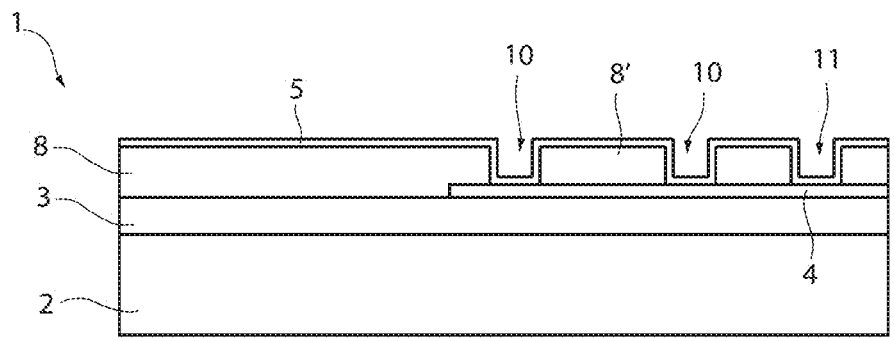

The method then proceeds, FIG. 6, with the formation of an etch stop layer 5 above the sacrificial layer 8 and the surface portions of the structural layer 4 exposed through the trench 10 and the opening 11. The etch stop layer 5 is, according to an embodiment of the present disclosure, of aluminum oxide ($Al_2O_3$), also known as alumina. The etch stop layer 5 has, for example, a thickness of a few tens of nanometers, e.g., comprised between 20 and 60 nm, in particular 40 nm.

The etch stop layer 5 is formed through Atomic Layer Deposition (ALD) technique. The deposition of $Al_2O_3$ through ALD technique is known in the state of the art and is typically performed using trimethyl-aluminum (TMA, $Al(CH_3)_3$) and water ($H_2O$) vapors as reactants. Alternatively to $H_2O$ vapors, ozone ($O_3$) may be used. For example, deposition may occur using TMA as the aluminum source and $H_2O$ as the oxidant. The document by Steven M. George, Chem. Rev. 2010, 110, p. 111-131, or the document by Puurunen, R. L., J. Appl. Phys. 2005, 97, p. 121-301, describe possible methods for forming the etch stop layer 5.

Patent document WO 2013/061313 also describes a method for forming an etch stop layer of $Al_2O_3$ usable in the context of the present disclosure. In particular, as described in WO 2013/061313, the etch stop layer 5 is formed with a process which provides for ALD deposition of two intermediate layers of $Al_2O_3$, both being subject to crystallization. The sequence of: i) deposition of a first intermediate layer of $Al_2O_3$, ii) crystallization of the first intermediate layer, iii) deposition of a second intermediate layer of $Al_2O_3$, and iv) crystallization of the second intermediate layer, allows the formation of an etch stop layer 5, of $Al_2O_3$ with resistance properties to etching by solutions containing hydrofluoric acid (HF) and, above all, impermeability properties of the etch stop layer 5 to such HF-based solutions.

Furthermore, this etch stop layer 5, in addition to being resistant to etching with HF and impermeable to HF, shows optimum stiction properties to the underlying silicon oxide layer 8 and to the polysilicon layer 4, shows optimum dielectric properties which do not vary as a function of possible subsequent thermal treatments, shows little (negligible) variation in the warpage radius of the die 1, and shows high compatibility with thermal processes at high temperature (above 1000° C.).

Figure 7:
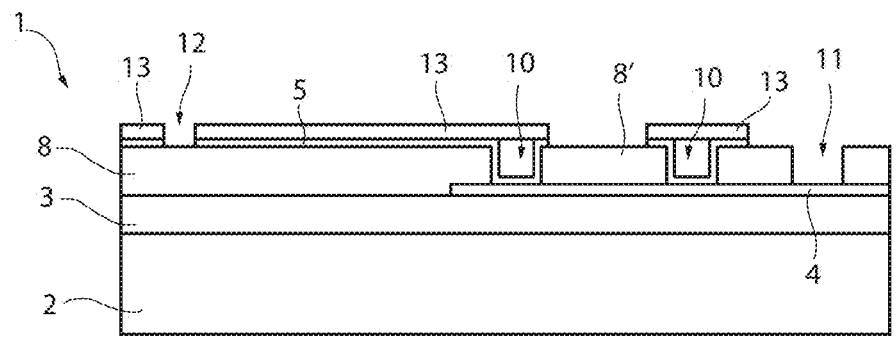

Then, FIG. 7, the method proceeds with a shaping or patterning step (e.g., through masked etching using an etching mask 13) of the etch stop layer 5, in order to selectively remove it at the region 8', from the bottom of the opening 11 (to expose the structural layer 4 in the opening 11) and at a peripheral region 12 of the die 1. Alignment marks to facilitate the subsequent manufacturing steps, and/or anchors to give structural solidity to the movable structures of the inertial sensor which will be formed later on, will be formed in the region 12.

In particular, it is noted that the etch stop layer 5 is patterned by removing selective portions thereof above the region 8', until reaching the surface of the region 8'. At least one portion of the surface of the region 8' is thus exposed through the opening thus formed in the etch stop layer 5. The zone of the region 8' exposed in this process step defines more precisely and further with respect to the trench 10 the shape and the spatial extent of the top plate of the capacitor which forms the active element of the pressure sensor, as better evident from the following description.

Figure 8:
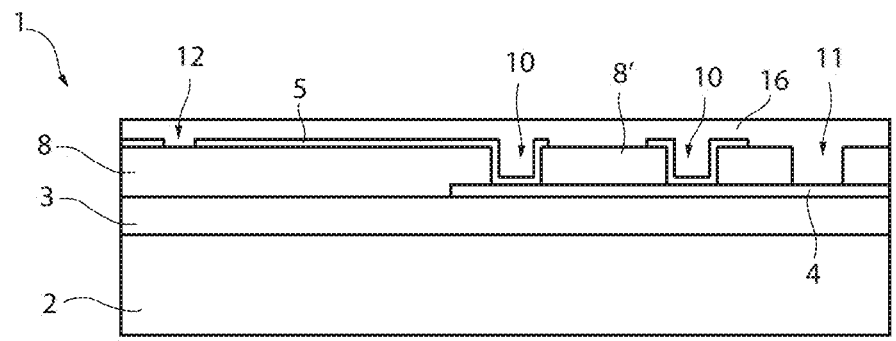

Then, FIG. 8, a deposition step of a structural layer 16 above the etch stop layer 15 and in the cavity 15a is performed, covering the surface of the region 8'. In one embodiment, the structural layer 16 is of conductive material, for example of doped polysilicon (e.g., with doping comprised between $1·10^{18}$ and $2·10^{20}$ ions/$cm^3$). Alternatively, the structural layer 16 may be of undoped polysilicon.

The structural layer 16 is for example deposited with the LPCVD technique. The structural layer 16 has a thickness, e.g., comprised between 0.2 µm and 1 µm.

The structural layer 16 extends inside the opening 11, until reaching and contacting the structural layer 4, and inside the opening 12.

Figure 9:
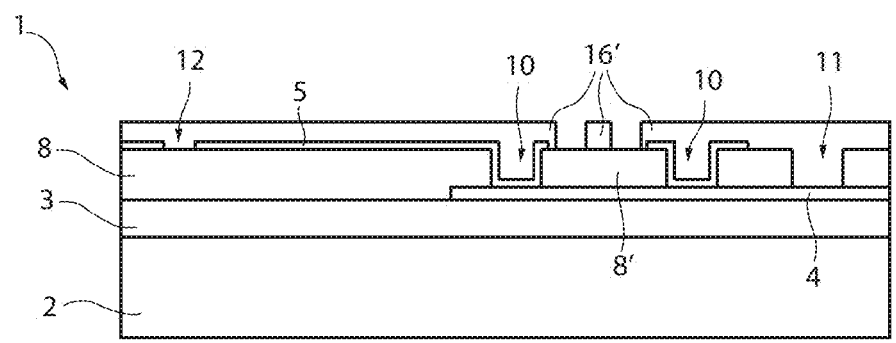

Subsequently, FIG. 9, the structural layer 16 is defined, for example photolithographically, to selectively remove it at the exposed surface of the region 8'. In particular, in one embodiment, the structural layer 16 is not completely removed at the surface of the region 8', so as to leave regions 16' which function as anchor for a subsequent layer that will be deposited later on (layer 20, illustrated in FIG. 10). It is apparent that, in other embodiments, in case this anchor is believed not to be necessary to structurally support the layer 20 of FIG. 10, the regions 16' are not formed and the structural layer 16 is completely removed at the surface of the region 8'.

Figure 10:
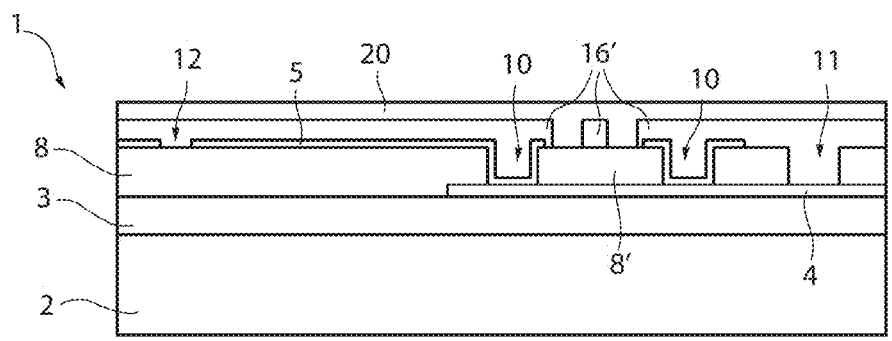

Then, FIG. 10, as mentioned, a permeable layer 20 is formed above the structural layer 16, the anchor regions 16' (if any) and the region 8' exposed between the anchor regions 16'.

The permeable layer 20 is, in one embodiment of the present disclosure, of polysilicon being permeable to the chemical solution used for the subsequent removal of the region 8'. For example, in the described embodiment, wherein the region 8' is of silicon oxide, hydrofluoric acid (HF), or solutions containing HF, may be used to selectively remove the region 8'. In this case, the permeable layer 20 is provided with pores or openings for allowing the flow of the hydrofluoric acid through the permeable layer 20, reaching and removing the region 8' and forming a buried cavity or chamber 22.

The permeable layer 20 is, in particular, of polycrystalline silicon, having holes (or pores) with a diameter ranging from 1 to 50 nm. The thickness of the permeable layer 20 is in the range of 50 to 150 nm, for example of 100 nm. The permeable layer 20 is for example deposited through LPCVD technique. According to an exemplary, non-limiting embodiment, the deposition conditions are in the traction-to-compression transition region, with a process window around 600° C. using a silane source gas, in a deposition environment with a pressure of about 550 mtorr. The dimensions of the pores of the permeable layer 20 are, in general, chosen in such a way that the chemical etching solution (liquid or gaseous) used to remove the region 8' may penetrate through the pores until reaching the permeable layer 20.

In general, the permeable layer 20 may be porous polysilicon, formed in a manner known in the literature, or polysilicon having holes (openings) actively formed following its deposition, through mechanical or physicochemical action for selectively removing the material.

Figure 11:
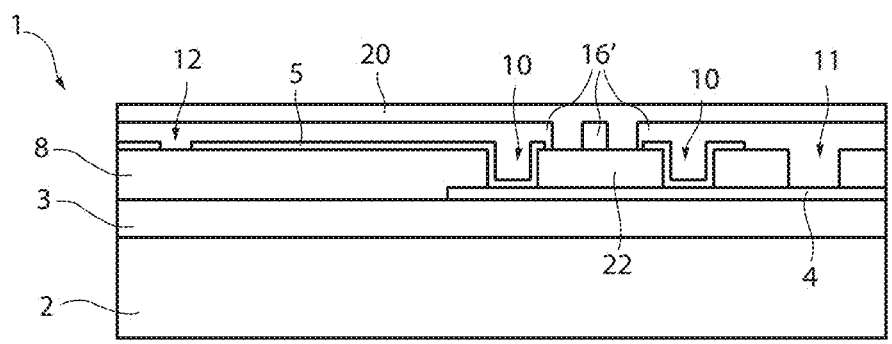

With reference to FIG. 11, an etching step of the region 8' is performed with HF or buffered HF mixtures or with vapor etching techniques using HF in the form of vapor. The material of the region 8' is completely removed and the buried cavity 22 is formed. As mentioned, the chemical agent used for the etching permeates through the openings or pores of the permeable layer 20 but not through the structural layer 16 and the etch stop layer 5.

Figure 12:
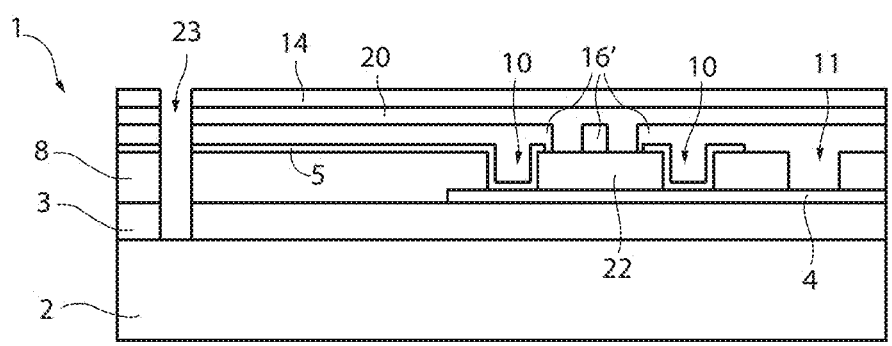

Then, FIG. 12, a further mask 14 is formed on the permeable layer 20, configured to protect the front 1a of the die 1 except for a region coinciding with the opening 12. All the layers exposed through the mask 14 are thus removed, up to reaching the substrate 2. An opening 23 is thus formed.

Figure 13:
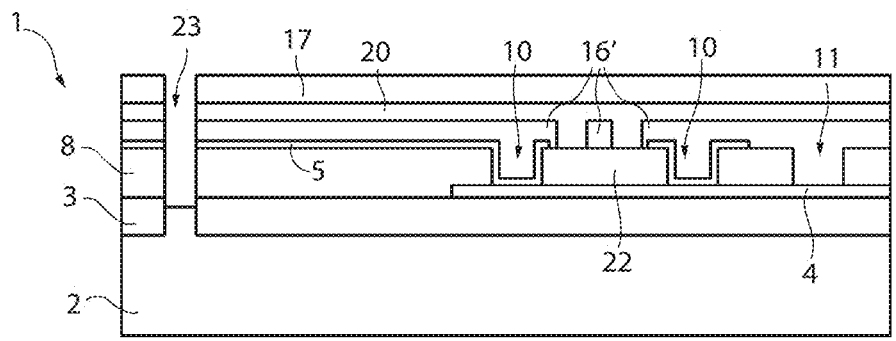

Then, FIG. 13, after removing the mask 14, a doped polysilicon layer 17 (for example of N-type) is formed (e.g., epitaxially grown) above the permeable layer 20. This doped polysilicon layer also grows in the opening 23 above the substrate 2, exposed in the step of FIG. 12. The thickness of the doped poly silicon layer 17 is, for example, in the range 0.2-1.5 µm. An additional layer of polysilicon, or other material, having a corrugated surface, may be, optionally, deposited in order to prevent possible stiction phenomena that might occur during the use of the inertial sensor. Alternatively, the surface of the polysilicon layer 17 may optionally be treated (mechanically or chemically) in order to provide this corrugated surface.

Figure 14:
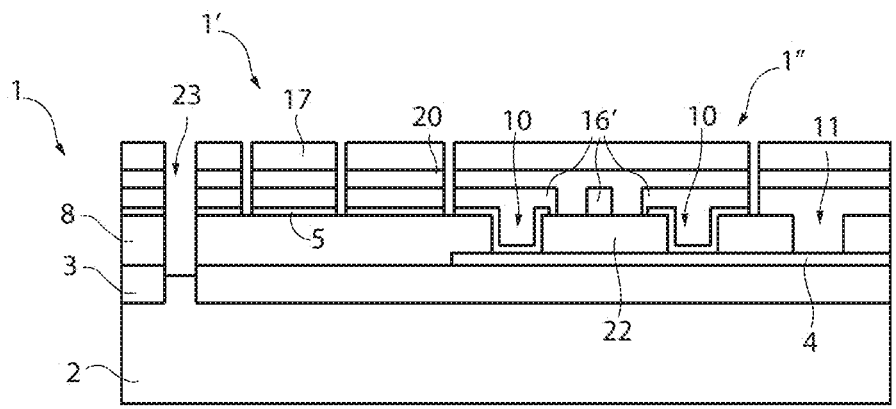

In FIG. 14, the doped polysilicon layer 17 is etched to remove selective portions thereof to form a plurality of conductive regions 18. The conductive regions 18 include conductive strips or electrical interconnections at a region 1' of the die 1 wherein the inertial sensor will be formed; the conductive regions 18 include the top electrode of the capacitor of the pressure sensor at a region 1" of the die 1 wherein the pressure sensor will be formed.

The etching of the polysilicon layer 17 removes the layers 17, 20 and 16, and stops at the etch stop layer 5.

Figure 15:
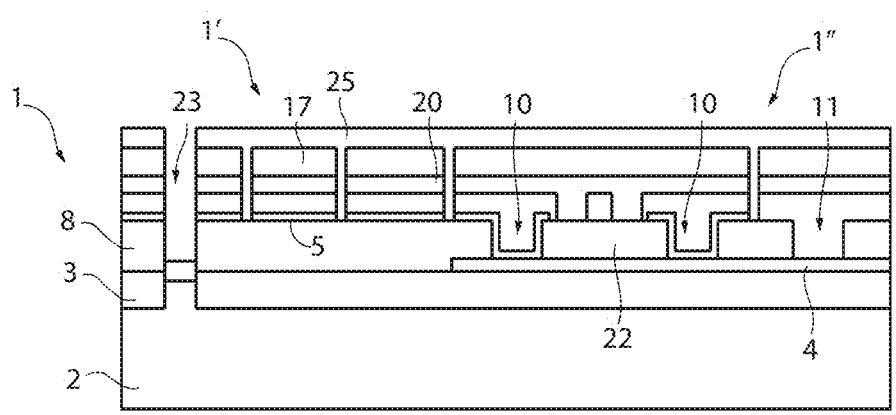

Then, FIG. 15, a sacrificial layer 25, for example of silicon oxide, in particular TEOS oxide, is formed. A polishing step (CMP) of the sacrificial layer 25 is then performed, at the end of which the sacrificial layer 25 has a thickness, along Z, comprised between 1.3 and 2 µm. The sacrificial layer 25 also extends inside the openings that separate the conductive strips/electrical interconnections/top electrode, defined with reference to FIG. 14, from each other.

The sacrificial layer 25 is also formed inside the opening 23.

Figure 16:
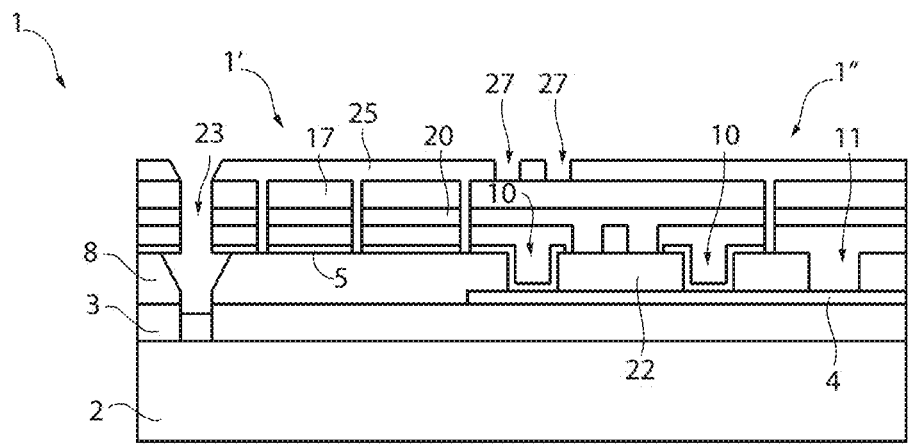

Then, FIG. 16, the sacrificial layer 25 is selectively etched to remove it completely from the inside of the opening 23 and in selective regions above the polysilicon layer 17, to form anchor openings 27.

Figure 17:
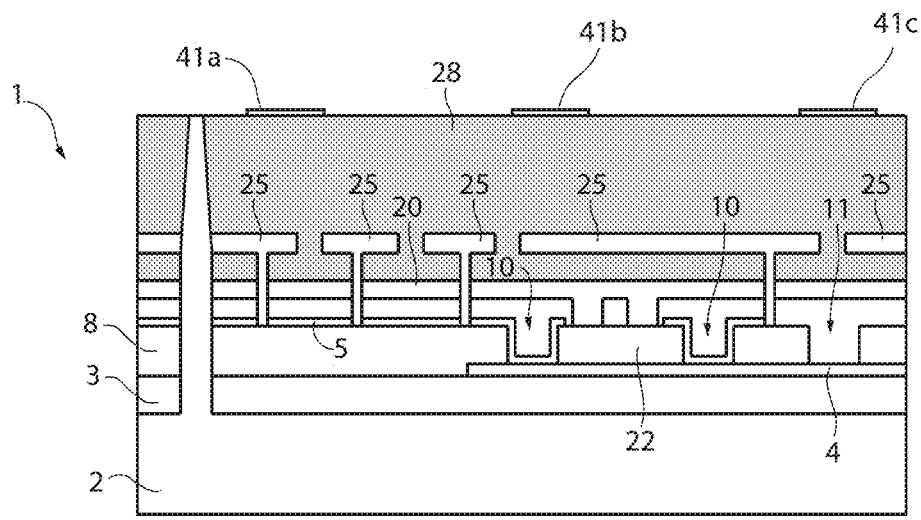

Then, FIG. 17, a structural layer 28 is formed above the sacrificial layer 25, in the opening 23 and in the additional anchor openings 27, for example by growing epitaxial polysilicon. One or more plurality of contact pads 41a, 41b, 41c may be preset on the structural layer 28. The plurality of contact pads 41a, 41b, 41c may include a first contact pad 41a, a second contact pad 41b, and a third contact pad 41c. In some embodiments, the first and second contact pads 41b, 41c may be contact pads of the first MEMS device 51, and the first contact pad 41a may be a contact pad of the second MEMS device 52.

The structural layer 28 can be processed as needed, to form structures having a desired shape.

Figure 18:
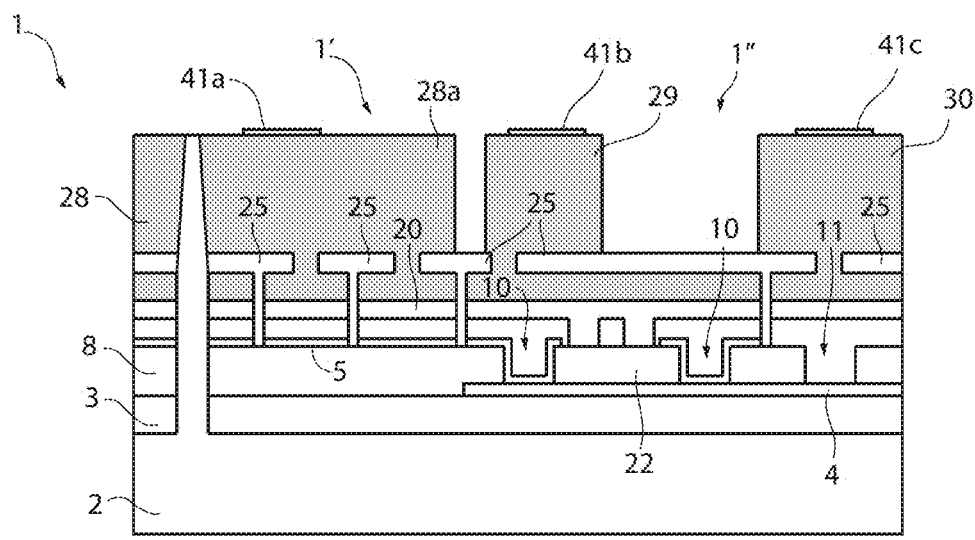

In FIG. 18, the structural layer 28 is selectively etched to form suspended structures 28a (e.g., a stator and a rotor), and electrical contact terminals 29, 30 configured to bias the top and bottom electrodes of the capacitor of the pressure sensor. In the same process step, portions of the structural layer 28 which extend on the membrane of the pressure sensor (at least partly on the cavity 22) are removed.

It should be noted, however, that in this manufacturing step, suspended structures 28a are still constrained to the underlying sacrificial layer 25, and therefore cannot move freely. The sacrificial layer 25 also extends above the membrane that forms the top electrode of the capacitor of the pressure sensor, which is too thick and at least partially constrained in its movements.

Figure 19:
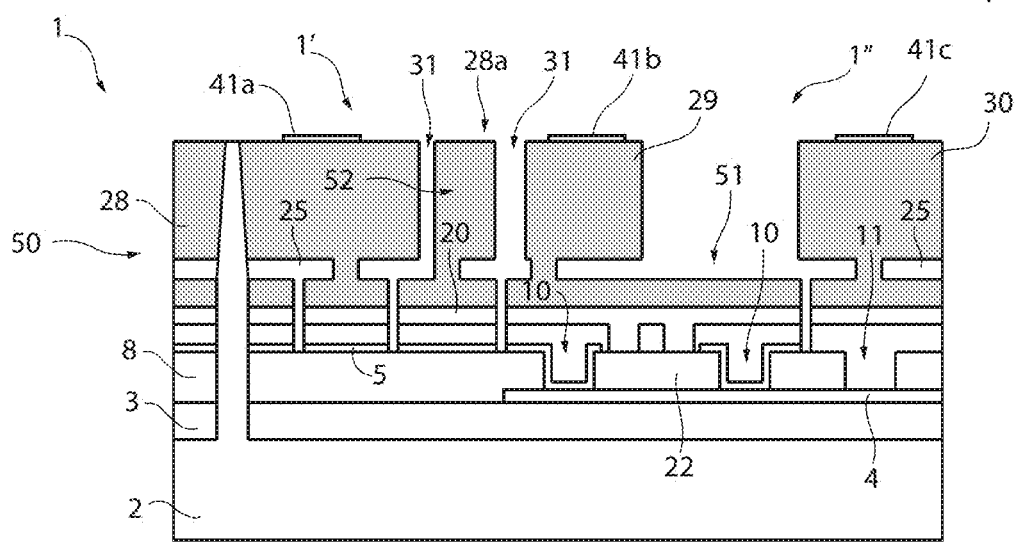

Therefore, in FIG. 19, through holes 31 are formed at the suspended structures 28a to allow the removal of the sacrificial layer 25 so as to partially suspend the suspended structures 28a.

An etching step, for example in HF, through the through holes 31 allows portions of the sacrificial layer 25 to be removed. The suspended structures 28a may therefore move or oscillate according to the degrees of freedom foreseen during the design step. The shape and design details of the suspended movable structures 28a are per se known in the state of the art, and are not subject matter of the present disclosure.

In the same process step, the portion of the sacrificial layer 25 which extends on the membrane of the pressure sensor is also removed.

The formation of the first micro-electro-mechanical structure 51 (herein, a capacitive pressure sensor) and the second micro-electro-mechanical structure 52 (herein, an inertial sensor) of the MEMS system 50 is thus completed.

Figure 26:
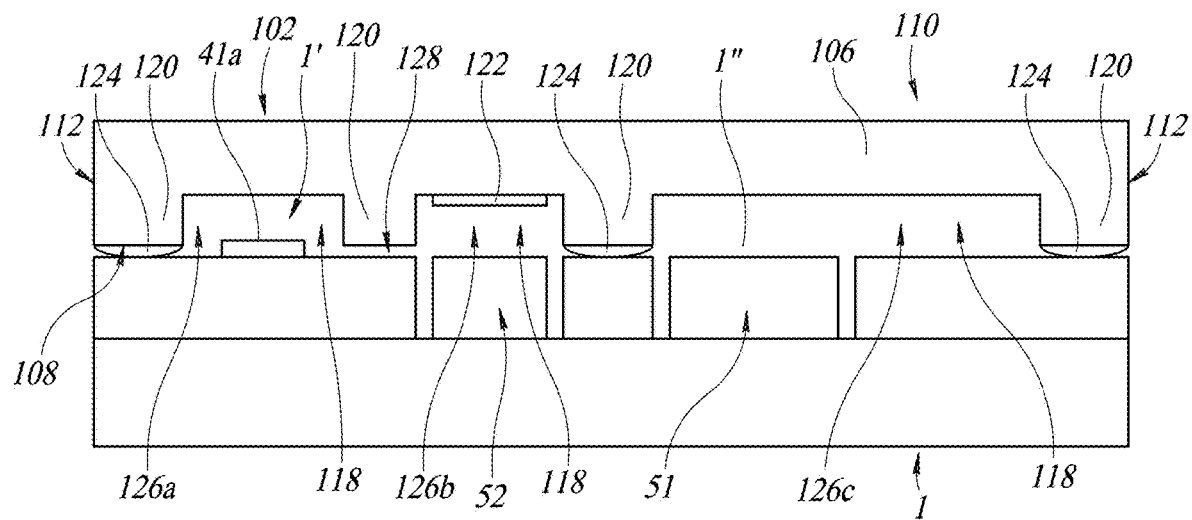
Figure 27:
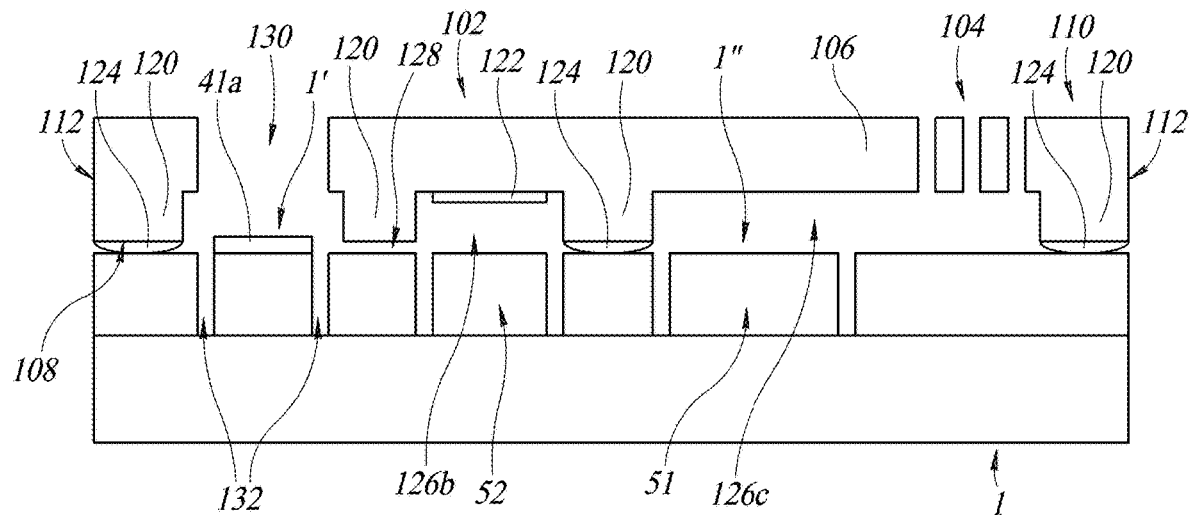

The manufacturing of the MEMS system 50 may comprise further steps, for example of forming and coupling a cap 102 (see FIG. 27 of the present disclosure) to form a semiconductor device or package 100 (see FIG. 27 of the present disclosure). The cap 102 protects the first and second micro-electro-mechanical structures 51, 52. The cap 102 comprises a plurality of protrusions 120, which may be referred to as a plurality of mechanical coupling regions, provided with solder paste or adhesive tape, or other coupling means, configured to be physically coupled to respective regions of the die 1 so as to surround (in top view) and protect the first and second micro-electro-mechanical structures 51, 52. Through holes 104 (see FIG. 27 of the present disclosure) are formed in the cap 102 at the pressure sensor, to allow a fluidic access towards the membrane (i.e., an access of the environmental pressure that is intended to be sensed/measured during use). The details of forming the cap 101 and the cap 101 itself will be discussed in further detail later herein with respect to FIGS. 22-26 of the present disclosure.

A getter layer, of a per se known type, is optionally present to generate a predefined pressure (low pressure) at the inertial sensor 52.

As mentioned, in one embodiment, the pressure sensor 51 is of capacitive type, even more particularly an absolute pressure sensor configured to sense a pressure variation external to the sensor with respect to the pressure value present inside the buried cavity 22 (set during the manufacturing step). The first and second electrodes face each other through the buried cavity 22. According to a different and further embodiment, the pressure sensor 51 is of differential capacitive type, configured to provide a signal identifying the difference between two environmental pressures at which the same sensor is subject. The differential pressure sensor is manufactured according to the same steps previously described for the pressure sensor 51, with the addition of a further process step aimed at connecting the cavity 22 to the outside, in order to be able to operate the pressure sensor as a differential sensor. To this end, the cavity 22 is fluidically connected to the outside of the pressure sensor, e.g., through a suitably provided channel which allows the flow of air (or other fluid in gaseous form) from and to the cavity 22. The resulting deformation of the membrane is indicative of the difference between a first environmental pressure P1 (external to the cavity 22) and a second environmental pressure P2 (internal to the cavity 22), and the signal transduced by the differential pressure sensor is a differential pressure signal. In use, the pressures P1 and P2 are pressures of environments being separated from each other. Patent documents U.S. Pat. Nos. 7,763,487 and 8,008,738 describe packages usable in the context of the present disclosure, to package a pressure sensor of differential type.

Figure 20:
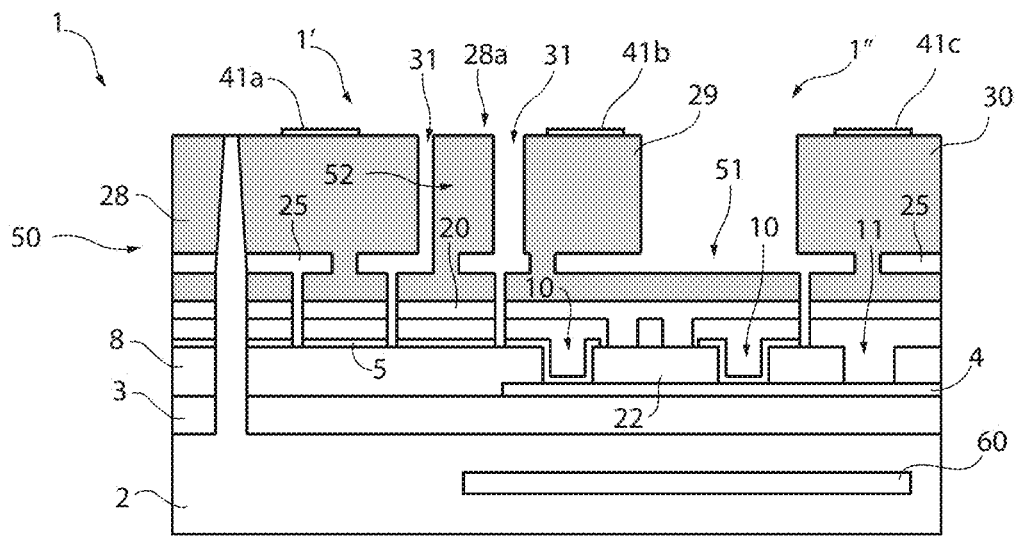
FIG. 20 illustrates an integrated MEMS system according to a further embodiment of the present disclosure.

In a further embodiment, FIG. 20, the pressure sensor 51 further comprises a further buried cavity or chamber 60 extending into the substrate 2, below the cavity 22. In this manner, the portion of the die 1 above the buried cavity 60 forms a further membrane which may deflect to release any residual stresses from the manufacturing or which may arise during the use of the pressure sensor, preventing any structural problems such as breaks, cracks, deformations. The buried cavity 60 may be formed, in a per se known manner, for example according to the formation process of buried cavities described in U.S. Pat. Nos. 7,763,487 and 8,008,738.

Figure 21:
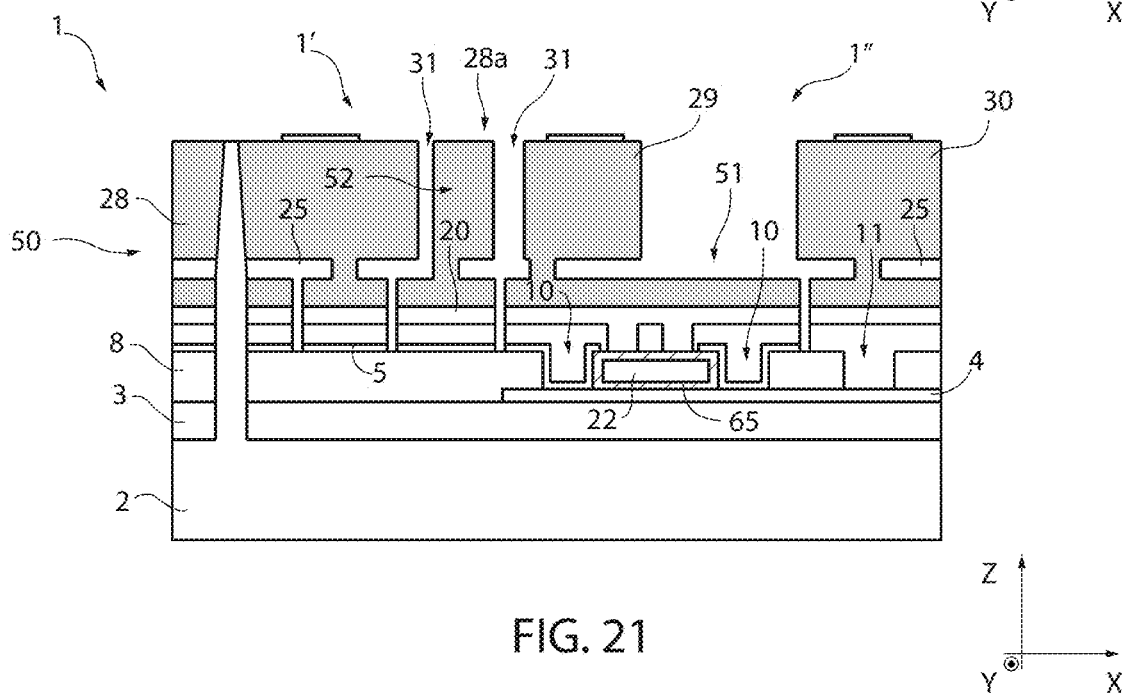
FIG. 21 illustrates an integrated MEMS system according to a further embodiment of the present disclosure.

According to a further embodiment of the present disclosure, illustrated in FIG. 21, the cavity 22 further comprises an anti-stiction layer 65. The anti-stiction layer 65 may cover the internal walls of the cavity 22 completely or only partially.

The anti-stiction layer 65 is of a material chosen in such a way as to limit or prevent even the partial occlusion of the cavity 22 due to a potential mutual stiction of the walls that delimit the cavity 22 upwardly and downwardly. This unwanted effect would cause the impossibility for the membrane to move correctly and consequent failure of the pressure sensor 51.

The anti-stiction layer 65 may be introduced into the cavity 22 through a suitable opening which puts the cavity 22 in communication with the environment in which the deposition of the anti-stiction layer 65 occurs. This opening may later be closed in the case of an absolute pressure sensor, or may be the opening used to put the cavity 22 in fluidic communication with the external environment in the case of a differential pressure sensor.

The deposition of the anti-stiction layer 65 may occur through a vapor-phase process.

Materials usable for the anti-stiction layer 65 include, but are not limited to, chlorosilanes, trichlorosilanes, dichlorosilanes, siloxanes, etc., such as, for example:
DDMS—"dimethyldichlorosilane";
FOTS—"perfluorooctyltrichlorosilane";
PF10TAS—"perfluorodecyltris(dimethylamino)silane";
PFDA—"perfluorodecanoic acid."

Usable materials, and the deposition processes thereof, are known in the state of the art, in particular from Ashurst, W. & Carraro, C. & Maboudian, Roya. (2004), "Vapor phase anti-stiction coatings for MEMS" Device and Materials Reliability, IEEE Transactions on. 3. 173-178. 10.1109/TDMR.2003.821540.

A similar anti-stiction layer may also optionally be formed in the buried chamber 60.

The manufacturing methods and the devices described above, according to the various embodiments, have numerous advantages.

Thanks to the monolithic structure of the membrane, substantially free of empty zones, the membrane is robust and therefore particularly suitable for providing MEMS structures of different types, reducing the risk of breakage, deformation or damage that compromise its functionality.

The process is easy to carry out, since it does not have any particular criticalities or difficulties of execution, thus ensuring high yields and reduced final costs. It is also noted that the method for manufacturing the transduction structures of the MEMS sensors 51 and 52 requires the use of a single wafer of semiconductor material, thus resulting economically advantageous and with reduced criticalities due to the absence of gluing or bonding steps between wafers.

Furthermore, the manufacturing method is particularly flexible, since it allows to provide buried cavities and/or membranes of desired shape and size, both as regards the area and the thickness, in a simple manner. In particular, for the application as a pressure sensor, a high thickness of the membrane may be obtained, to increase the accuracy of the same sensor.

The use of porous silicon ensures that a membrane with a regular shape is obtained and prevents unwanted formations that would compromise or in any case reduce the electrical/mechanical features of the finished MEMS device.

The simultaneous presence of the two crystallized aluminum oxide layers prevents short circuits between the top and bottom electrodes of the capacitor and allows the diameter of the membrane, which is not dependent on the etching time, to be defined during the manufacturing step.

Furthermore, thanks to the use of the crystallized aluminum oxide layer, the size of the membrane may be accurately defined, without using a time-etching. In fact, the crystallized aluminum oxide functions as a hard mask for the subsequent HF etching aimed at removing the oxide layer under the membrane.

The use of a HF-permeable polysilicon layer enables the formation of a porous grid that allows the HF to permeate and etch the oxide. The permeable polysilicon also serves as a support for the top layers.

As discussed herein within the present disclosure, the concurrent manufacturing of the inertial sensor allows an optimization of the integration of the various sensors on the same die, simplifying the process and reducing costs.

FIGS. 22-27 illustrate, in lateral cross-section view, manufacturing steps for forming the cap 102 and for coupling the cap 102 to the die 1 as shown in FIG. 19 to manufacture and form the semiconductor device or package 100 as shown in FIG. 27.

Figure 22:
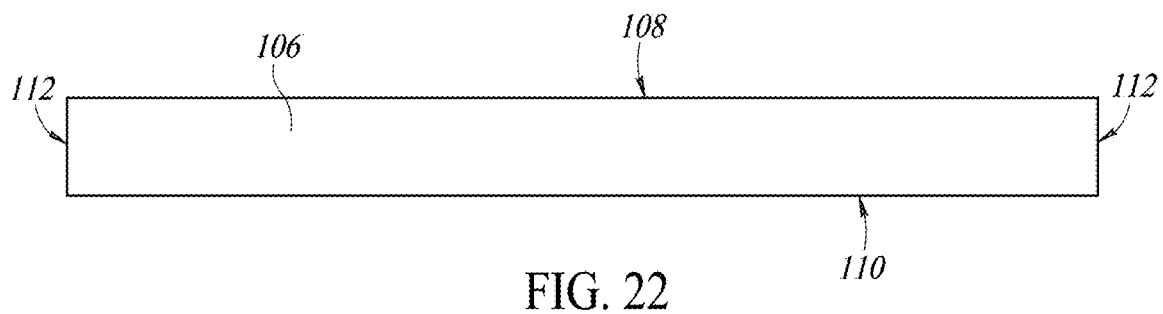
FIGS. 22-27 illustrate, in lateral cross-section view, manufacturing steps of a cap for coupling to the integrated micro-electro-mechanical system (MEMS) as shown in FIG. 19, according to an embodiment of the present disclosure.

As shown in FIG. 22, a wafer 106 includes a first surface 108, a second surface 110 opposite to the first surface 108, and a plurality of sidewalls 112 that extend from the first surface 108 to the second surface 110, respectively. The wafer 106 may be made of a semiconductor material, a silicon material, or some other suitable material for the wafer 106.

Figure 23:
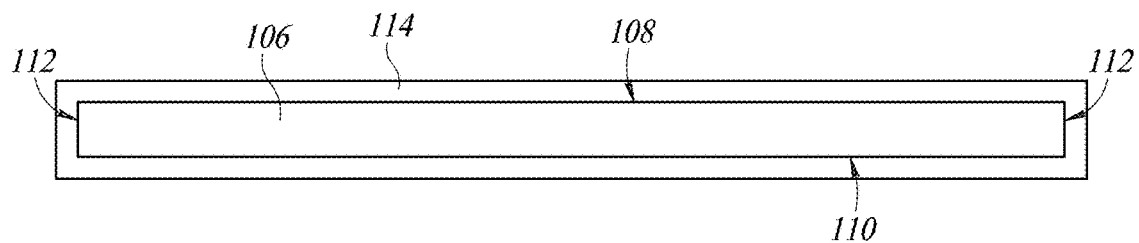

In a first step as shown in FIG. 23, an oxidation or insulating layer 114 is formed at the first surface 108, the second surface 110, and the plurality of sidewalls 112. For example, the oxidation layer 114 may be formed by oxidizing the first surface 108 and the second surface 110 of the wafer 106 by carrying out an oxidation process. In some embodiments, the oxidation process may be a thermal oxidation process in which silicon of the wafer 106 is converted to silicon oxide forming the oxidation layer 114, which is made of a silicon oxide.

Figure 24:
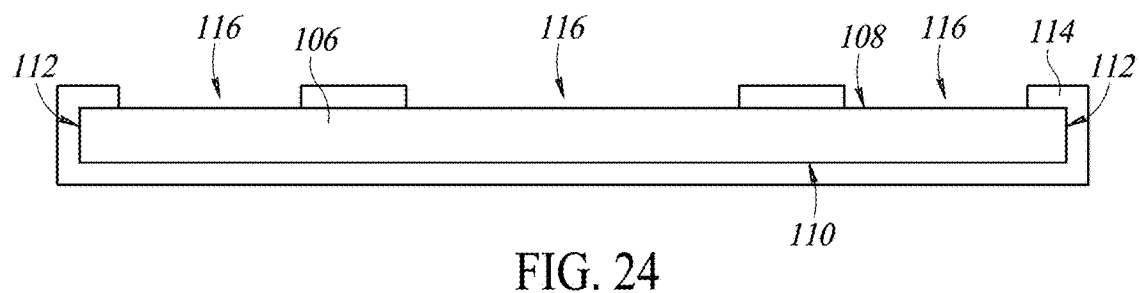

A second step as shown in FIG. 24 occurs after the first step as shown in FIG. 23. In the second step as shown in FIG. 24, the oxidation layer 114 is patterned resulting in a plurality of openings 116 being formed through the oxidation layer to the first surface 108 of the wafer 106 exposing respective areas or portions of the first surface 108 of the after 106 from the oxidation layer 114. The plurality of openings 116 may be formed by first forming a hard mask layer on the oxidation layer 114, removing portions of the hard mask layer to expose respective portions of the oxidation layer 114 that are to be removed to form the plurality of openings 115, and removing the exposed respective portions of the oxidation layer 114 forming the plurality of openings 116. After the plurality of openings 116 have been formed, the hard mask layer may be removed from the rest of the oxidation layer to result in the formation of the plurality of openings 116 as shown in FIG. 24.

Figure 25:
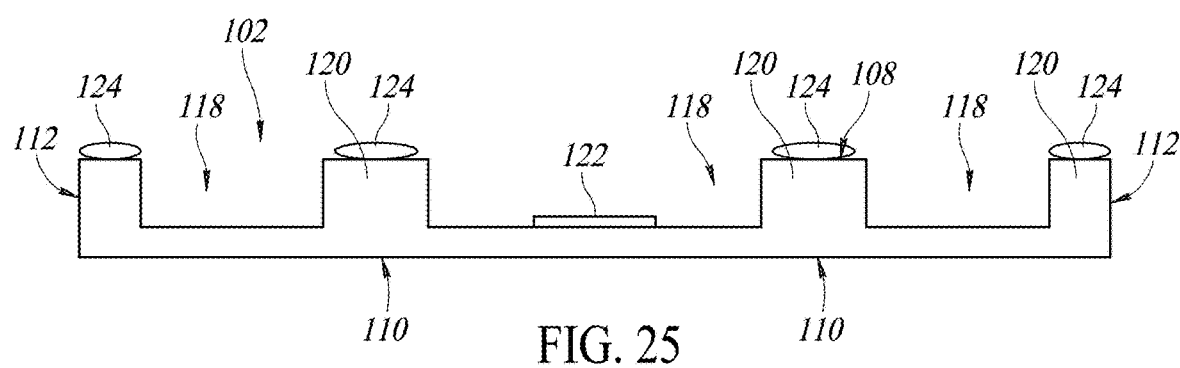

A third step as shown in FIG. 25 occurs after the second step as shown in FIG. 24. In the third step as shown in FIG. 25, respective portions and areas of the wafer 106 exposed from the oxidation layer 114 through the plurality of openings 116 are removed from the wafer 106 forming a plurality of recesses 118 and a plurality of protrusions 120 adjacent to ones of the plurality of recesses 118. For example, an etching process may be carried out to remove the respective portions and areas of the wafer 106 exposed from the oxidation layer 114 through the plurality of openings 116. This etching process may result in the removal of the oxidation layer 114 from the wafer 106. Alternatively, the oxidation layer 114 may be removed through an additional process that is performed after the removal of the respective portions of the wafer 106 forming the plurality of recesses 118 and the plurality of protrusions 120, respectively. After the plurality of recesses 118 and the plurality of protrusions 120 are formed. A getting layer 122, which may be referred to as a getter, getter layer, getter structure, getting structure, or some other similar or like suitable reference to the getting layer, is formed on at least one respective surface of at least one of the plurality of recesses 118. The getting layer 122 may be present to assist in providing a good vacuum within a cavity that is at least partially delimited by the respective recess of the plurality of recesses 118 in which the getting layer 122 is present as shown in FIG. 25.

Either before or after the getting layer 122 is formed, an adhesive material or structure 124 (e.g., a tape, a solder paste, a glasfrit material, or some other suitable adhesive material or structure) is formed on ones of the plurality of protrusions 120. In the embodiment as shown in FIG. 25, the adhesive material 124 is a glasfrit material.

After the third step, the cap 102 is formed such that the cap 102 includes the recesses 118 that are between adjacent ones of the plurality of protrusions 120 and the adhesive material or structure 124 is present on each one of the plurality of protrusions 120.

A fourth step as shown in FIG. 26 occurs after the third step as shown in FIG. 25. In the fourth step as shown in FIG. 26, the cap 102 may be flipped at which point the adhesive material 124 is utilized to couple the cap 102 to respective regions of a surface of the die 1 as shown in FIG. 19. Coupling the cap 102 to the respective regions of the surface of the die 1 results in defining and delimiting a plurality of cavities 126a, 126b, 126c. The plurality of cavities 126a, 126b, 126c includes a first cavity 126a, a second cavity 126b, and a third cavity 126c. The first and second cavities 126a, 126b are in fluid communication with each other along a fluidic pathway 128, which is between one of the plurality of protrusions 120 of the cap 102 and the surface of the die 1.

A fifth step as shown in FIG. 27 occurs after the fourth step as shown in FIG. 26. In the fifth step as shown in FIG. 27, an opening 130 is formed through the cap to expose the first contact pad 41a. The opening 130 may be formed to provide access to the first contact pad 41a. A plurality of the through holes 104 may be formed either before or after the opening 130, or may be formed simultaneously with the opening 130. The through holes 104 result in the membrane being in fluid communication with an environment external to the third cavity 126c in which the membrane is present. For example, the membrane may be a membrane of the pressure sensor 51. After the opening 130 is formed, a plurality of trenches 132 may be formed such that the region 1' of the die is further defined between the plurality of trenches 132. The opening 130, the through holes 104, and the trenches 132 may be formed by carrying out successively multiple etchings or multiple techniques that results in removing respective portions of the cap 102 and the die 1 to form the opening 130, the through holes 104, and the trenches 132, respectively.

In alternative embodiments of a method of manufacturing the cap 102 and coupling the cap 102 to the die 1, these various steps discussed above may be reorganized and completed in a different order to form the semiconductor device or package 100 or alternative embodiments that are similar to the semiconductor device or package 100.

Finally, it is clear that modifications and variations may be made to the method and device described and illustrated herein without thereby departing from the scope of the present disclosure, as defined in the attached claims.

The teaching of the present disclosure may be used to provide MEMS devices, semiconductor devices, or semiconductor packages of different types with respect to those described, such as accelerometers, gyroscopes, resonators, valves, and the like, in which case the structures below and/or above the membrane are adapted according to the intended application.

In case integrating electronic components in the same die 1 (e.g., an ASIC or other circuits for processing or treating signals) is desired, this may be carried out using the substrate 2 or further epitaxial layers formed between the substrate 2 and the structural layer 4.

A method for manufacturing a micro-electro-mechanical system, MEMS, (50) including a first MEMS device (51) and a second MEMS device (52), may be summarized as including the steps of forming, on a substrate (2), a first electrode (3) of the first MEMS device (51); forming, on the first electrode (3), a first sacrificial layer (8, 8') of a material that may be removed through an etching chemical solution; forming, on the first sacrificial layer (8, 8'), a protection layer (5) impermeable to said etching chemical solution; selectively removing portions of the protection layer (5) to expose a respective sacrificial portion (8') of the first sacrificial layer (8, 8'); forming, on the sacrificial portion (8'), a membrane layer (20) of a porous material, which is permeable to said etching chemical solution; forming a cavity (22) by removing the sacrificial portion (8') through the membrane layer (20) using said etching chemical solution; forming a first structural layer (17) which seals pores of the membrane layer (20) and forms, with the membrane layer, a suspended structure (17, 20) of the first MEMS device (51), said suspended structure (17, 20) being a second electrode capacitively coupled to the first electrode (3) through the cavity (22); forming, above the first structural layer (17), a second sacrificial layer (25) of a material which may be etched through said etching chemical solution; forming a second structural layer (28) above, and in contact with, the second sacrificial layer (25); patterning the second structural layer (28) to concurrently form movable structures (28a) of the second MEMS device (52) and biasing structures (30) of the first and second electrodes of the first MEMS device (51, 52); removing selective portions of the second sacrificial layer (25) through said etching chemical solution, making said movable structures (28a) of the second MEMS device (52) and said suspended structure of the first MEMS device (51) free to move according to respective degrees of freedom.

Said etching chemical solution may include hydrofluoric acid, HF, and said protection layer (5) may include crystallized Aluminum Oxide.

The membrane layer (20) may be of porous silicon or silicon having a plurality of through holes or pores.

The first structural layer (17) may be of conductive doped polysilicon.

Forming said second structural layer (28) may include removing selective portions of the second sacrificial layer (25) and forming part of the second structural layer (28) through said removed portions of the second sacrificial layer (25) until reaching and electrically contacting the first structural layer (17).

The step of forming the second structural layer may include epitaxially growing polysilicon.

The method may further include the step of forming a buried chamber (42) in the substrate (2) below, and at least partially aligned with, the cavity (22).

The method may further include the step of fluidically connecting the cavity (22) with an environment external to said micro-electro-mechanical system (50) through a through opening.

The method may further include the step of internally covering the cavity (22) through an anti-stiction layer (65) causing chemical species including chlorosilanes, trichlorosilanes, dichlorosilanes, siloxanes to flow through said through opening.

Said movable structures (28a) of the second MEMS device (52) may include a movable mass of a gyroscope and/or a movable mass of an accelerometer.

Said first MEMS device (51) may include a capacitive pressure sensor and said second MEMS device (52) includes an inertial sensor.

A micro-electro-mechanical system, MEMS, (50) including a first MEMS device (51) and a second MEMS device (52), and may be summarized as including a substrate (2); a first electrode (3) pertaining to the first MEMS device (51) extending on the substrate (2); a first sacrificial layer (8, 8'), of a material that may be removed through an etching chemical solution, on the first electrode (3); a protection layer (5), impermeable to said etching chemical solution, on the first sacrificial layer (8, 8'); a membrane layer (20), of a porous material which is permeable to said etching chemical solution, on the sacrificial portion (8'); a cavity (22) extending under the membrane layer (20); a first structural layer (17) which seals pores of the membrane layer (20) and forms, with the membrane layer, a suspended structure (17, 20) of the first MEMS device (51), said suspended structure (17, 20) being a second electrode capacitively coupled to the first electrode (3) through the cavity (22); and a second structural layer (28) patterned to form movable structures (28a) of the second MEMS device (52) and biasing structures (30) of the first and second electrodes of the first MEMS device (51, 52), wherein said movable structures (28a) of the second MEMS device (52) and said suspended structure of the first MEMS device (51) are free to move according to respective degrees of freedom.

Said etching chemical solution may include hydrofluoric acid, HF, and said protection layer (5) may include crystallized Aluminum Oxide.

The membrane layer (20) may be of porous silicon or silicon having a plurality of through holes or pores.

The first structural layer (17) may be of conductive doped polysilicon.

The second structural layer may be of epitaxial polysilicon.

The system may further include a buried chamber (42) in the substrate (2) below, and at least partially aligned with, the cavity (22).

The system may further include a fluidic connection path configured to connect the cavity (22) with an environment external to said micro-electro-mechanical system (50) through a through opening.

The system may further include an anti-stiction layer (65) internally covering the cavity (22), the anti-stiction layer including chlorosilanes, trichlorosilanes, dichlorosilanes, siloxanes.

Said movable structures (28a) of the second MEMS device (52) may include a movable mass of a gyroscope and/or a movable mass of an accelerometer.

Said first MEMS device (51) may include a capacitive pressure sensor and said second MEMS device (52) includes an inertial sensor.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a first MEMS device;
   a second MEMS device;
   a substrate;
   a first electrode coupled to the first MEMS device extending on the substrate;
   a first layer on the first electrode;
   a protection layer, impermeable to an etching chemical solution, on the first layer;
   a membrane layer, of a porous material which is permeable to the etching chemical solution, on the protection layer;
   a cavity overlapped by the membrane layer, the cavity is defined by at least one lower surface of the membrane layer, at least one upper surface of the first electrode that faces the at least one lower surface, and at least one sidewall of the protection layer that is transverse to the at least one lower surface of the membrane layer and the at least one upper surface of the first electrode;
   an anti-stiction layer is within the cavity and covers the at least one lower surface of the membrane layer, the at least one upper surface of the electrode, and the at least one sidewall of the protection layer;
   a first structural layer seals pores of the membrane layer and forms, with the membrane layer, a suspended structure of the first MEMS device, the suspended structure being a second electrode capacitively coupled to the first electrode through the cavity; and
   a second structural layer is on the first structural layer, and the second structural layer includes:
      moveable structures of the second MEMS device; and
      biasing structures of the first and second electrodes of the first MEMS device.

2. The device according to claim 1, wherein the etching chemical solution comprises hydrofluoric acid, HF, and the protection layer includes crystallized Aluminum Oxide.

3. The device according to claim 1, wherein the membrane layer is of porous silicon or silicon having a plurality of through holes or pores.

4. The device according to claim 1, wherein the first structural layer is of conductive doped polysilicon.

5. The device according to claim 1, wherein the second structural layer is of epitaxial polysilicon.

6. The device according to claim 1, further comprising a buried chamber in the substrate below, and at least partially aligned with, the cavity.

7. The device according to claim 1, further comprising:
a fluidic connection path configured to connect the cavity with an environment external to the micro-electro-mechanical system through a through opening.

8. The device according to claim 1, wherein the movable structures of the second MEMS device include at least one of a movable mass of a gyroscope and a movable mass of an accelerometer.

9. The device according to claim 1, wherein the first MEMS device includes a capacitive pressure sensor and the second MEMS device includes an inertial sensor.

10. The device of claim 1, wherein the anti-stiction layer includes chlorosilanes, trichlorosilanes, and dichlorosilanes, siloxanes.

11. A device, comprising:
a substrate including a surface;
a first electrode extending on the surface of the substrate;
a plurality of layers on the surface of the substrate, the plurality of layers including:
a first layer on the first electrode;
a protection layer that is impermeable to an etching chemical solution on the first layer; and
a membrane layer of a porous material on the protection layer, the porous material of the membrane layer is permeable to the etching chemical solution;
a cavity defined by at least one lower surface of the membrane layer, at least one upper surface of the first electrode that faces the at least one lower surface, and at least one sidewall of the protection layer that is transverse to the at least one lower surface of the membrane layer and the at least one upper surface of the first electrode;
an anti-stiction layer is within the cavity and covers the at least one lower surface of the membrane, the at least one upper surface of the electrode, and the at least one sidewall of the protection layer;
a structural layer on the plurality of layers;
a plurality of through holes extending into the structural layer and extending into the plurality of layers;
a first MEMS device including a membrane of the plurality of layers and the structural layer overlapping the cavity; and
a second MEMS device adjacent to the first MEMS device.

12. The device according to claim 11, wherein:
the first MEMS device is a capacitive sensor; and
the second MEMS device is an inertial sensor.

13. The device of claim 12, wherein:
the first MEMS device is a pressure sensor; and
the second MEMS device is at least one of the following of a gyroscope, an accelerometer, or a combined structure that includes both the accelerometer and the gyroscope.

14. The device of claim 11, further comprising a fluidic connection path configured to connect the cavity with an environment external to the micro-electro-mechanical system through a through opening.

15. A device, comprising:
a substrate including a surface;
a first electrode extending on the surface of the substrate;
a plurality of layers on the surface of the substrate, the plurality of layers includes:
a first layer on the first electrode;
a protection layer that is impermeable to an etching chemical solution on the first layer; and
a membrane layer of a porous material on the protection layer, the porous material of the membrane layer is permeable to the etching chemical solution;
a cavity defined by at least one lower surface of the membrane layer, at least one upper surface of the first electrode, and at least one sidewall of the protection layer that is transverse to the at least one lower surface of the membrane layer and the at last one upper surface of the first electrode;
an anti-stiction layer is within the cavity and covers the at least one lower surface of the membrane, the at least one upper surface of the electrode, and the at least one sidewall of the protection layer, and the anti-stiction layer fully and completely lines the cavity;
a structural layer on the plurality of layers;
a plurality of through holes extending into the structural layer and extending into the plurality of layers;
a first MEMS device including a membrane of the plurality of layers and the structural layer overlapping the cavity;
a second MEMS device adjacent to the first MEMS device; and
an anti-stiction layer is within the cavity, lines the cavity, and partially fills the cavity.

16. The device of claim 15, wherein the porous material is of porous silicon or silicon having a plurality of through holes or pores.

17. The device of claim 15, further comprising a fluidic connection path configured to connect the cavity with an environment external to the micro-electro-mechanical system through a through opening.

18. The device of claim 15, wherein the first MEMS device is a capacitive sensor.

19. The device of claim 18, wherein the second MEMS device is an inertial sensor.

20. The device of claim 19, wherein:
the first MEMS device is a pressure sensor; and
the second MEMS device is at least one of the following of a gyroscope, an accelerometer, or a combined structure that includes both the accelerometer and the gyroscope.

* * * * *